Aug. 13, 1935.  R. C. SPRAGUE  2,011,126
CAPACITOR MOTOR
Filed April 11, 1933
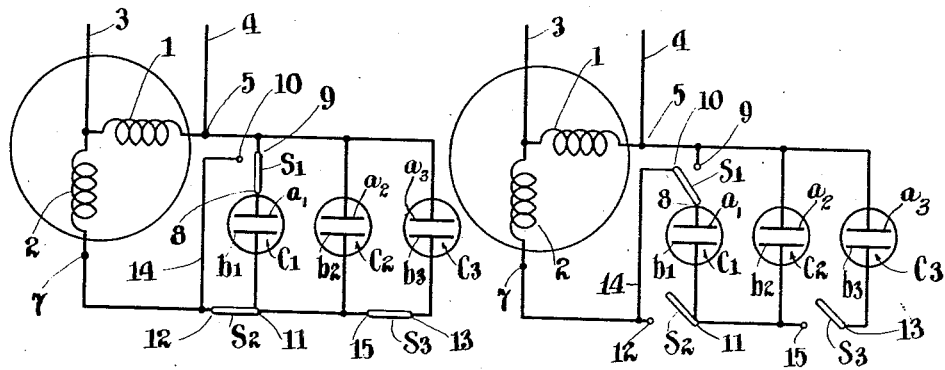
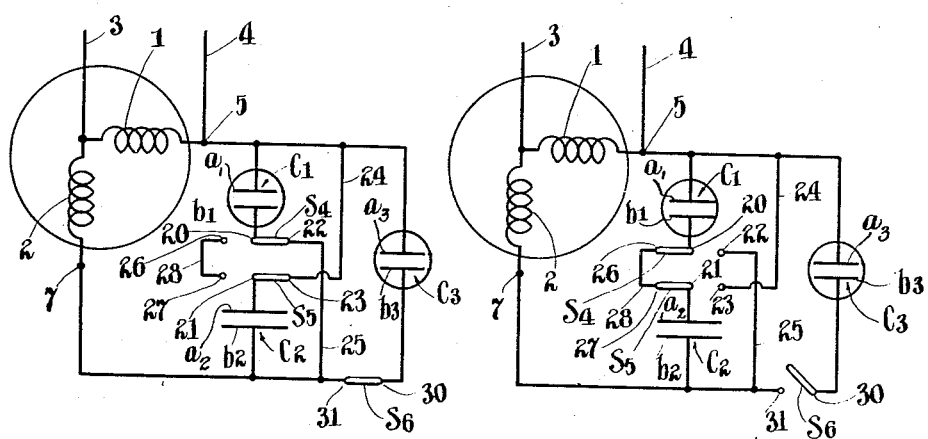
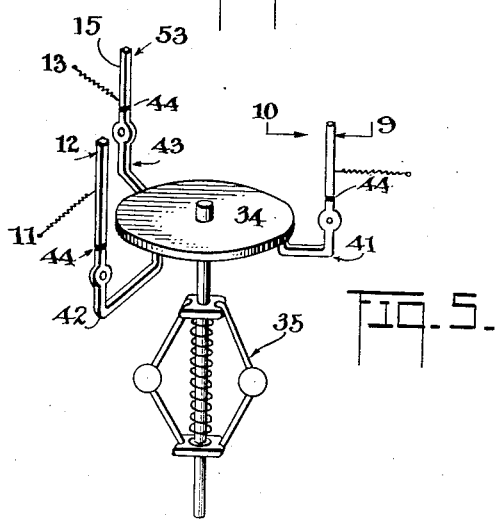
ROBERT C. SPRAGUE
INVENTOR
BY *Dorsey & Cole*
ATTORNEYS Patented Aug. 13, 1935

2,011,126

UNITED STATES PATENT OFFICE 2,011,126

CAPACITOR MOTOR

Robert C. Sprague, North Adams, Mass., assignor to Sprague Specialties Co., North Adams, Mass., a corporation of Massachusetts Application April 11, 1933, Serial No. 665,615

4 Claims. (Cl. 172—279)

The present invention relates to capacitor motors and more particularly to novel circuit arrangements and switching means which provide for a more economical manufacture of such motors and improve the motor characteristics.

Capacitor motors are used to a considerable extent in the case of small horse-power motors, and in many applications have well-known advantages over repulsion-induction or split-phase motors used for similar purposes.

As a rule such capacitor motors are provided with two windings and one or more condensers are used for the starting of the motor, as well as during the operation of the motor. A well-known arrangement is, for instance, the one shown in Figure 5 of U. S. Patent to Bailey No. 1,707,424, according to which a large capacity condenser is connected across the motor windings for the starting of the motor and a smaller capacity condenser is connected across the motor during the normal operation.

As the starting condenser remains in the circuit only for a very short time interval, it merely needs to be dimensioned for intermediate use. Therefore it has already been suggested to use for the starting condenser, electrolytic condensers which will stand up in intermittent use, the characteristics of which, however, would make them unsuited for continuous use under the prevalent conditions.

My invention has for its object a still more economic utilization of the condensers. According to my invention all of the condensers, including those required for continuous operation, are only used for "light duty" and can be electrolytic condensers.

In addition the condensers are so designed, the constants of the circuit so selected, and the circuit changes from starting to running so organized, that the duty of the condensers is substantially the same for starting as for running conditions. In view of this, as will be more fully explained later on, the condensers are in no case over-dimensioned and are utilized in the most economical way.

The invention will be illustrated with respect to a preferred arrangement but is not limited to such. According to the arrangement to be described three condensers are provided which, for the starting of the motor, are all connected in parallel and across the windings of the stator, and two of which are automatically connected in series combination and across said windings when the motor has reached, or is about to reach, its normal running speed, and remain so connected while the motor is running. The third condenser used in starting is altogether disconnected when the motor is running.

The various advantages obtained with my invention will be more fully discussed later on.

In the drawing forming part of the specification:

Figure 1 is a schematic diagram showing an embodiment of my invention in which three condensers are provided, all of which are connected in parallel and across the motor windings for the starting of the motor, the figure showing the circuits as established for the starting of the motor.

Figure 2 is a schematic diagram showing the circuit arrangement of Fig. 1 for running conditions, whereby two of the condensers are connected in series and across the motor windings and the third condenser is disconnected.

Fig. 3 is a modified arrangement of my invention, showing the circuit connections for the starting of the motor.

Fig. 4 is a schematic diagram corresponding to the arrangement of Fig. 3 showing the circuit connections while the motor is running.

Fig. 5 is a perspective diagrammatic view of a speed governor operated switch arrangement, to be used in connection with the circuits of Figs. 1 and 2.

Referring to Figs. 1 and 2, the conductors 3 and 4 represent the alternating current supply to which the stator is connected. The two windings 1 and 2 of the stator winding of the motor are interconnected with one of their ends and this common point is connected to the conductor 3. The free terminal 5 of the winding 1 is connected to the other supply conductor 4. The rotor of the motor is not shown.

Three condensers $C_1$, $C_2$ and $C_3$ are provided, all three being preferably electrolytic condensers, which in view of their inherent characteristics and dimensions would not be adapted to stand in continuous operation the voltage existing across the terminals 5 and 7 while the motor is running, but which are well adapted to stand the voltage existing across these terminals during the starting of the motor and for the short-time intervals required to start the motor.

For starting the motor the three condensers $C_1$, $C_2$ and $C_3$ are connected in parallel and across terminals 5 and 7, this condition being shown in Fig. 1, whereas when the motor is running, the condensers $C_1$ and $C_2$ are connected in series and their series combination connected across said windings, and the condenser $C_3$ is disconnected, this condition being shown in Fig. 2.

The capacity of the condensers $C_1$ and $C_2$ is so selected that in their series connection the resulting capacity, which is $$\frac{C_1 \times C_2}{C_1 + C_2}$$

gives the desired capacity across the windings while the motor is running. The capacity of the condenser $C_3$ is then so selected that the capacity resulting from the parallel connection of the three condensers; i. e. $C_1+C_2+C_3$, gives the proper value of the capacity required for the starting of the motor.

Thus, for instance, if a starting capacity of 40 microfarads and a running capacity of 4 microfarads is required, each of the condensers $C_1$ and $C_2$ may have a capacity of 8 microfarads and the condenser $C_3$ would then have a capacity of 24 microfarads.

To change the circuit connections from those required for starting to those required for running, I provide a switch, preferably of the centrifugal type, having three switch members $S_1$, $S_2$ and $S_3$. The general construction and operation of such centrifugal switches being well-known, illustration of its construction is not deemed necessary. It should be merely mentioned that when the motor attains a speed close to its normal running speed, the centrifugal action of the switch causes the switch members $S_1$, $S_2$ and $S_3$ to change their position from that shown in Fig. 1 to that shown in Fig. 2.

The switch $S_1$ has its heel 8 in permanent electrical connection with the terminal $a_1$ of the condenser $C_1$ and with its free end either contacts with a contact 9 or with a contact 10. For starting the motor, as shown in Fig. 1, the switch member $S_1$ contacts with the contact 9.

The switch member $S_2$ has its heel 11 in permanent electrical connection with the terminal $b_1$ of the condenser $C_1$. For starting, the free end of switch member $S_2$ contacts with the contact 12, which in its turn is connected to the terminal 7 of the winding 2. When the motor is running the switch member $S_2$ is open.

The switch member $S_3$ has its heel 13 in permanent electrical connection with the terminal $b_3$ of condenser $C_3$. For the starting of the motor this switch member contacts with the contact 15, which in its turn is connected to heel 11. When the motor is running the switch member $S_3$ is open.

As appears from Figure 1, for the starting of the motor (and while it is at standstill) the three condensers $C_1$, $C_2$ and $C_3$ are all connected in parallel and across the terminals 5 and 7 of the windings 1 and 2 respectively. The circuit for the condenser $C_1$ goes from terminal 5, through contact 9, closed switch member $S_1$, condenser $C_1$, through closed switch member $S_2$, contact 12 to terminal 7.

The circuit for condenser $C_2$ goes from terminal 5, through condenser $C_2$, through closed switch member $S_2$ to terminal 7.

The circuit for condenser $C_3$ goes from terminal 5 through condenser $C_3$, through closed switch members $S_3$ and $S_2$ to terminal 7.

When the motor is running, as shown in Fig. 2, switch member $S_1$ contacts with contact 10, while switch members $S_2$ and $S_3$ are open. The condensers $C_1$ and $C_2$ are thereby connected in series and across terminals 5 and 7, and their circuit is as follows: from terminal 5, through condenser $C_2$, condenser $C_1$, switch member $S_1$, contact 10, conductor 14 to terminal 7. The circuit of condenser $C_3$ is interrupted at the open switch member $S_3$.

A switch arrangement to be used for the circuit arrangements of Figs. 1 and 2 is shown in Fig. 5. 35 represents a centrifugal type governor operated by the motor shaft and provided with a disc 34, the vertical displacement of said disc being dependent upon the motor speed. The operation of such a device is well known.

The switches $S_1$, $S_2$ and $S_3$ form part of pivoted angle arms 41, 42 and 43, the switches being insulated at 44 from the rest of the arms.

The arms are held against the plate by springs 8, 11 and 13, respectively, which also serve as corresponding electrical connections to the contact pieces.

In Fig. 5 the device is shown at rest or rotating below the predetermined speed which will cause the plate to move the arms $S_1$, $S_2$ and $S_3$. In this position the switches $S_1$, $S_2$ and $S_3$ assume the position shown in Fig. 1, whereby $S_1$ connects 8 to 9, $S_2$ connects 11 to 12, and $S_3$ connects 13 to 15.

When the governor rotates above the predetermined speed, disc 34 depresses arms $S_1$, $S_2$ and $S_3$, which presses the switch arms inwardly in positions corresponding to Fig. 2, whereby switch $S_1$ disconnects 8 from 9 and connects it to 10, and switches $S_2$ and $S_3$ are opened.

It can be readily seen that by a simple rearrangement of the contacts of Fig. 5, the governor can be used for an arrangement as shown in Figs. 3 and 4.

Figs. 3 and 4 show an arrangement in which the same results are obtained as in the arrangement of Figs. 1 and 2 in a somewhat different way. The switch again consists of three switch members $S_4$, $S_5$ and $S_6$. The heel 20 of the switch member $S_4$ is in permanent electrical connection with the terminal $b_1$ of the condenser $C_1$, and for the starting of the motor the switch member $S_4$ contacts with a contact 22, and when the motor is running at its normal speed, the switch member contacts with a contact 26.

The switch member S—5 is permanently connected with its heel 21 to the terminal $a_2$ of condenser $C_2$. For the starting of the motor the switch member $S_5$ contacts with a contact 23 and when the motor is running at normal speed this switch member contacts with a contact 27.

The contacts 26 and 27 may form a single contact; however, for the sake of clarity they are shown as separate contacts which are interconnected by a conductor 28.

The switch $S_6$ with its heel 30 is in permanent electrical connection with the terminal $b_3$ of condenser $C_3$. While the motor is starting the switch member S—6 is closed and contacts with a contact 31, while in normal operation of the motor the switch member $S_6$ is open.

The terminal $a_1$ of condenser $C_1$, the terminal $a_3$ of condenser $C_3$ and the contact 23 are in permanent electrical connection with the terminal 5; and the terminal $b_2$ of condenser $C_2$, and the contacts 22 and 31 are in permanent electrical connection with the terminal 7.

In Fig. 3 the connections are shown as established while the motor is at a standstill and during its starting, and it will be thus seen that the condensers $C_1$, $C_2$ and $C_3$ are connected in parallel and across the terminals 5 and 7.

The circuit of the condenser $C_1$ can be traced as follows: from terminal 5 through condenser $C_1$, through switch member $S_4$, contact 22, conductor 25 to terminal 7.

The circuit for condenser $C_2$ can be traced as follows: from terminal 5, conductor 24, contact 23, switch members S—5, condenser $C_2$ to terminal 7.

The circuit of condenser $C_3$ can be traced as follows: from terminal 5, condenser $C_3$, switch member $S_6$, contact 31 to terminal 7.

When the motor is running at normal speed the circuits are established as shown in Fig. 4, whereby the series-connected condensers $C_1$, and $C_2$ are connected across the terminals 5 and 7, and the condenser $C_3$ is disconnected. The circuit of condensers $C_1$ and $C_2$ can be traced as follows: terminal 5, condenser $C_1$, switch member $S_4$, contact 26, conductor 28, contact 27, switch member $S_5$, condenser $C_2$, terminal 7.

The advantages obtained with my invention will appear from the following considerations:

In the usual type of capacitor motors the starting condenser is greatly in excess of the condenser used in the normal running of the motor, the ratio between the two condensers being of the order of 10 to 1 and even higher.

As has been already stated, the condenser which is only used for the starting of the motor, being subjected to intermittent service only, can be either a comparatively inexpensive type of paper condenser, for instance, a paraffin impregnated two-paper layer container, or preferably an electrolytic condenser.

On the other hand, the "running" condenser needs to be dimensioned for continuous operation, and in past practice condensers of comparatively expensive construction, for instance, oil impregnated paper condensers having three or more paper layers have been used for this purpose.

As is well known, the electrolytic condensers used with capacity motors comprise two electrodes of film-forming material, for instance, aluminum, which are provided with an electrolytically formed film. The electrolyte may be liquid, but the condensers used for capacity motors are preferably of the dry type in which the electrolyte is of pasty constituency. The electrolyte as a rule comprises a weak acid, for instance, boric acid, phosphoric acid, etc. preferably in combination with a salt of a weak acid for example ammoniumborate, borax, etc. The electrolyte also comprises an ionizing solvent, for instance, a polyhydric alcohol and some water. The paste-like electrolyte is interposed between the filmed electrodes, preferably being carried by a suitable spacer, and the electrodes with the interposed electrolyte are wound into a roll which is suitably encased and protected against moisture.

Electrolytic condensers used in alternating current circuits in view of their comparatively high power factor and other inherent characteristics, at the present state of their development, are not well suited to stand in continuous operation voltages exceeding about 200 volts, and can be most economically made for operating voltages of about 100 to 120 volts. The voltages which the running condensers of capacitor motors have to stand are generally in excess of the latter values.

However, electrolytic condensers have various advantages over paper condensers. One of the important advantages is the much lower cost of electrolytic condensers compared with paper condensers, and especially with high-grade paper condensers as had to be used as the "running" condensers of capacitor motors.

A further advantage of electrolytic condensers is that due to their self-healing properties their operating voltage can closely approximate their breakdown voltage, whereas in the case of paper condensers in the absence of such properties a large safety factor is required; i. e. the breakdown voltage has to be greatly in excess of the operating voltage; for instance, an electrolytic condenser which has a breakdown voltage of 150 volts can safely operate up to voltages of 125 volts and even higher, whereas to safely operate at 125 volts paper condensers, there is required a breakdown voltage of 400 volts or even more.

In view of the above great economic advantages are obtained by my invention; for instance, in the case of a ⅙ H. P. capacitor motor of a given construction, the capacitive load for starting is 500 voltamperes, and the capacitive load for running is 200 voltamperes. Under the given conditions this can be obtained by using 115 microfarads for starting and 10 microfarads for running. By using a 10 microfarad paper condenser for running, a 115 or 105 microfarad electrolytic condenser would be used for starting (the smaller value in case the paper condenser is connected in parallel with the electrolytic condenser for the starting of the motor).

On the other hand, according to the invention the running condenser is made up of two electrolytic condensers of 20 microfarads each connected in series. These two condensers connected in parallel with each other and with a third electrolytic condenser of 75 microfarads, make up the starting condenser of 115 microfarads.

The cost of the two electrolytic condensers of 20 microfarads each is only about one-half of that of the 10 microfarad heavy-duty paper condenser which they replace, and besides there is a saving of 30 (or 40) microfarads on the starting condenser.

My invention is not limited to an arrangement in which three condensers are connected in parallel for the starting of the motor, two of which are connected in series for running the motor and the third condenser disconnected, but other similar combinations may be used; for instance, only two condensers may be used which are connected in parallel for starting the motor and connected in series for running the motor. Or again, three condensers may be used which are connected in parallel for starting the motor and all three of which are connected in series for running the motor.

However, under most conditions the provision of three condensers, all three of which are connected in parallel for starting and only two of which are connected in series for running, gives the best results as it permits the condensers to be subjected to substantially the same voltage conditions during both the starting and the running of the motor.

This will more clearly appear when further considering the above example. Although the capacitive loads are connected to the same terminals 5 and 7 of the windings both during the starting and the running of the motor, the voltages which are applied to these loads are not the same in starting as in running.

As appears, the impedance of the capacitive load at starting is much smaller than the impedance of the capacitive load in running and due to this, as well as to other conditions existing in the motor, the voltage across the capacitive load will have a lower value in starting, than in running. For instance, with an inductance of approximately .16 henry of winding 2 and under the usual conditions of the above referred to motor, the voltage across the parallel connected condensers during the start is 110 volts, whereas the voltage applied to the series combination of condensers C—1 and C—2 during running is 230 volts, 115 volts being applied to each condenser. Thus in this case the voltage applied to the condensers is substantially the same under starting and running conditions.

Under similar conditions if two condensers only are used which are in parallel for starting the motor and in series for running the motor, without using a third starting condenser, under the most favorable conditions the voltage across the condenser for starting will be 148 volts, whereas in running the voltage applied to the series combination will be 187 volts, with 93.5 volts applied to each of the condensers. Thus it will be seen that not only is the voltage applied to the condensers in starting considerably higher than in the former case, but in running the voltage applied to the individual condensers is only about ⅔ of the value of the voltage applied in starting.

If three condensers are used, all three of which are connected in parallel for starting, and all three connected in series for running, under most favorable conditions, the voltage applied to the condensers in starting will be again 110 volts, but the voltage applied in running to the series combination of the three condensers will be 200 volts with only about 66 volts applied to the individual condensers. Thus in running only about 60% of the permissible voltage is applied to the condensers.

Thus it will appear that for the reasons given above the combination of three condensers in parallel and two in series gives in general the best and most economical arrangement.

It should be noted that the electrolytic condensers which are to be used in series combination, should preferably be of such character that their equivalent series-resistance decrease rather than increase with the temperature.

A further advantage of my invention is due to the fact that the cost of the condensers forms a considerable portion of the cost of the capacitor motors, and there has been in prior practice a tendency to economize in the size of condensers used, whereby a compromise was reached which did not provide for the best operating characteristics of the motor. Because, when using my invention the cost of the condenser forms a much smaller portion of the cost of the capacity motors, it is possible to use sufficiently high capacities to obtain the best operating characteristics of the motor.

The above advantage is made possible also by the simple and convenient automatic switching arrangement provided for the motor.

While I have described my invention in connection with specific embodiments and in specific arrangements, I do not wish to be limited to such, as various deviations from my invention may suggest themselves. I wish, therefore, the appended claims to be construed as broadly as permissible in view of the prior art.

What I claim as new and desire to secure by Letters Patent is:

1. The combination of an induction motor having a winding, three electrolytic condensers and means including a switch assembly to connect said condensers in parallel and across said winding for the starting of the motor, and to connect a series combination of only two of said condensers across said winding when the motor is running at its normal speed.

2. An induction motor comprising two windings connected together at one of their ends, a source of alternating current connected to the ends of one of said windings, and three electrolytic condensers, and means to connect the condensers in multiple and across the ends of said windings not connected together for the starting of the motor, and to connect only two of said condensers in series and across said last mentioned ends for the normal operation of the motor.

3. A circuit arrangement comprising an induction motor and a winding therefor, three electrolytic condensers and means to connect said condensers in multiple and across said winding for the starting of the motor, and to connect only two of said condensers in series across said winding while the motor is running at its normal operating speed, said means comprising a switch having three switching members which are actuated simultaneously by centrifugal force when the motor approaches its normal speed.

4. A circuit arrangement comprising an induction motor and a winding therefor, three condensers and three switch members, said three switch members being actuated together by centrifugal force when the motor approaches its normal running speed, two of said switch members serving to connect two of said condensers in multiple across said winding before said switch members are actuated by the centrifugal force, and to connect them in series and across said winding when they are actuated by said force, said third switch member connecting the third condenser in multiple with the first two condensers before being actuated by said force and disconnecting said third condenser after being actuated thereby.

ROBERT C. SPRAGUE.